(12) United States Patent
Kish et al.

(10) Patent No.: US 6,505,952 B1
(45) Date of Patent: *Jan. 14, 2003

(54) SAFETY FLASHLIGHT (75) Inventors: Paul A. Kish, Wilkes-Barre Twp., PA (US); Randy S. Cramer, Lebanon, PA (US)

(73) Assignee: Koehler-Bright Star, Inc., Wilkes Barre, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/715,974

(22) Filed: Nov. 17, 2000

Related U.S. Application Data (63) Continuation of application No. 09/346,864, filed on Jul. 2, 1999, now Pat. No. 6,161,938.

(51) Int. Cl.[7] .................................................. F21L 7/00
(52) U.S. Cl. ...................... 362/197; 362/190; 362/191; 362/208
(58) Field of Search .................................. 362/183, 190, 362/191, 202, 203, 205, 206, 207, 208, 368; 320/106, 110, 107, 112, 113

(56) References Cited

U.S. PATENT DOCUMENTS

| 4,147,163 A | 4/1979 | Newman et al. |
| 4,382,220 A | 5/1983 | Marshall et al. |
| 4,751,452 A | 6/1988 | Kilmer et al. |
| 5,239,451 A | 8/1993 | Menke et al. |
| 5,357,411 A | 10/1994 | Menke et al. |
| 5,410,237 A | 4/1995 | Sharrah et al. |
| 5,446,633 A | 8/1995 | Hangoi |
| 5,652,496 A | * 7/1997 | Pilarzyk et al. ................. 320/2 |
| 5,684,378 A | 11/1997 | Furth et al. |
| 5,772,309 A | * 6/1998 | Groben ........................ 362/183 |
| 6,161,938 A | * 12/2000 | Kish et al. ................... 362/183 |

* cited by examiner

Primary Examiner—Sandra O'Shea
Assistant Examiner—Anabel Ton
(74) Attorney, Agent, or Firm—Piper Rudnick

(57) ABSTRACT

A flashlight particularly useful by safety personnel such as a firefighter and capable of operation with chargeable battery means or non-chargeable battery means. The flashlight includes a one piece plastic casing having a tubular body portion defining a battery compartment and a right angled head portion in which a light bulb is mounted. The battery compartment is closed by an end cap on which electrical conductive means is mounted to form a part of the battery circuit when non-rechargeable batteries are placed in the compartment. A plurality of charging contacts are mounted on the rear wall of the body portion of the flashlight for enabling rechargeable batteries to be recharged while in the compartment. The charging contacts are recessed within the rear wall of the battery compartment so that they can not be engaged by non-rechargeable batteries within the compartment. This prevents the non-rechargeable batteries from being damaged if the flashlight were inadvertently placed into a charging unit with non-rechargeable batteries in the compartment. The circuitry connecting the batteries to the light bulb includes uniquely structured elements which we quickly and easily connected together to facilitate assembly of the flashlight.

36 Claims, 6 Drawing Sheets

SAFETY FLASHLIGHT

This is a continuation of application No. 09/346,864, filed Jul. 2, 1999, now U.S. Pat. No. 6,161,938.

BACKGROUND OF THE INVENTION

This invention relates generally to flashlight and more particularly to a flashlight of novel construction especially useful by firefighters and other safety personnel working in hazardous environments.

There are many known flashlights of various designs, sizes, and configurations, but few of those are specially designed for use in hazardous environments. None of those adequately satisfies the requirements for flashlights operating as firefighting equipment. For example, a light used by firefighters must be durable and impact resistant, and must survive drops of up to about thirty feet. It must be temperature resistant and waterproof. It must produce a high intensity light output to cut through smoke, fog, and dust. The light needs to be constructed in a way that it meets UL safety requirements in the United States and Canada and Cenelec requirements in foreign markets. In spite of these severe operating requirements, the light must still be portable and lightweight and easily attachable to the protective clothing or firefighting equipment worn by the firefighter so that the light does not impose any excessive weight on the firefighter and the firefighter has both hands free for other purposes. Because the firefighter often wishes to hold a light in his hand, the light must have a comfortable grip which does not cause the hand or arm of the firefighter to tire.

The hazardous environment in which a firefighter's light is to be used demands that the light have an adequate power source for lighting the bulb over an extended period of time so that the firefighter is not deprived of a source of light while in a smoke filled, burning building. To enhance the usefulness of the flashlight, it should be operable with either rechargeable batteries, which can be quickly recharged, or non-rechargeable batteries both of which should be quickly and easily replaceable within the battery housing. In addition, the non-rechargeable batteries, when in the battery housing, should be completely isolated from the recharging circuit so that the non rechargeable batteries are not destroyed if the flashlight is inadvertently placed onto a charger unit with the non-rechargeable batteries therein. Otherwise, the non-rechargeable batteries may explode, not only causing damage to the flashlight but also possibly injuring the firefighter himself.

While the specialized flashlight must satisfy all these requirements for operation under very severe and hazardous conditions, to be accepted commercially the light must still be manufactured and assembled in a way which minimizes cost.

The firefighters flashlight of the invention described hereinbelow was developed with those requirements in mind.

SUMMARY OF THE INVENTION

Accordingly, the primary object of this invention is to provide a novel flashlight particularly adapted for use in severe hazardous conditions, such as use by a firefighter, and capable of satisfying the requirements noted above.

Still another object of the invention is to provide a novel firefighter's light which is portable, lightweight, small in size, durable and operable with a rechargeable battery pack or non-rechargeable batteries, both of which are quickly and easily replaced within the battery compartment.

Still another object of the invention is to provide the above novel flashlight in which the non-rechargeable batteries, when in the battery compartment, are isolated from the recharging circuit and can not be destroyed if the flashlight is inadvertently placed into a charging unit. The rechargeable battery pack and the non-rechargeable batteries fit securely and snugly in the battery housing, but are quickly and easily replaceable when necessary. The rechargeable battery pack has contacts on one side thereof which engage against the charging contacts extending through a recessed portion of the rear wall of the battery housing for recharging the battery pack when necessary. When non-rechargeable batteries are placed within the battery housing, they do not engage the recharging contacts but rather make electrical connection through a conductive pad mounted on the bottom cap of the battery housing. In this way, the non-rechargeable batteries are isolated from the recharging contacts.

Another object of the invention resides in the provision of the above novel flashlight in which the bulb containing head compartment is at right angles to the battery compartment and in which the electrical components connecting the batteries to the bulb are all quickly and easily assembled through push fits without requiring any separate wires and soldering connections. This greatly reduces the assembly time and therefor reduces cost.

A further object of the invention resides in the provision of the above flashlight in which all the various components of the flashlight are secured snugly in place to ensure proper and continued operation of the flashlight under the abusive handling in severe and dangerous conditions experienced by a firefighter.

Other objects and advantages of the invention will become apparent from reading the detailed description of the invention which follows, wherein reference is made to the accompanying drawings.

DETAILED DESCRIPTION OF THE INVENTION

Referring now to the drawings the novel flashlight 20 of the invention includes a one-piece, rigid, plastic casing 22 having an elongated generally rectangular lower tubular body portion 24, with an enlarged base 25, defining an internal battery receiving compartment 26, the bottom open end of which is normally dosed by a bottom cap assembly 28 which fits within base 25. Casing 22 also includes an upper head portion 30 connected at a right angle to the body portion 24 having an outer generally cylindrical wall 31 defining an open ended bulb mounting compartment 32, which is normally closed by a head cap assembly 34. Battery compartment 26 is separated from bulb compartment 32 by a transverse wall or platform 36 integrally molded to the walls forming body portion 24.

A bulb 40 is mounted within compartment 32, a power source in the form of rechargeable NiCad battery pack 42 or four non-rechargeable C cell alkaline batteries 44a, 44b, 44c, and 44d mounted within battery compartment 46, provide power to bulb 40 through circuitry including left positive battery spring 46, right negative battery spring 48, and a push button operating switch assembly 50 mounted on the side of wall 31. The way in which bulb 40 is mounted within compartment 32 and the circuitry by which it receives power from battery terminals 46 and 48 will be described later.

Figure 9:
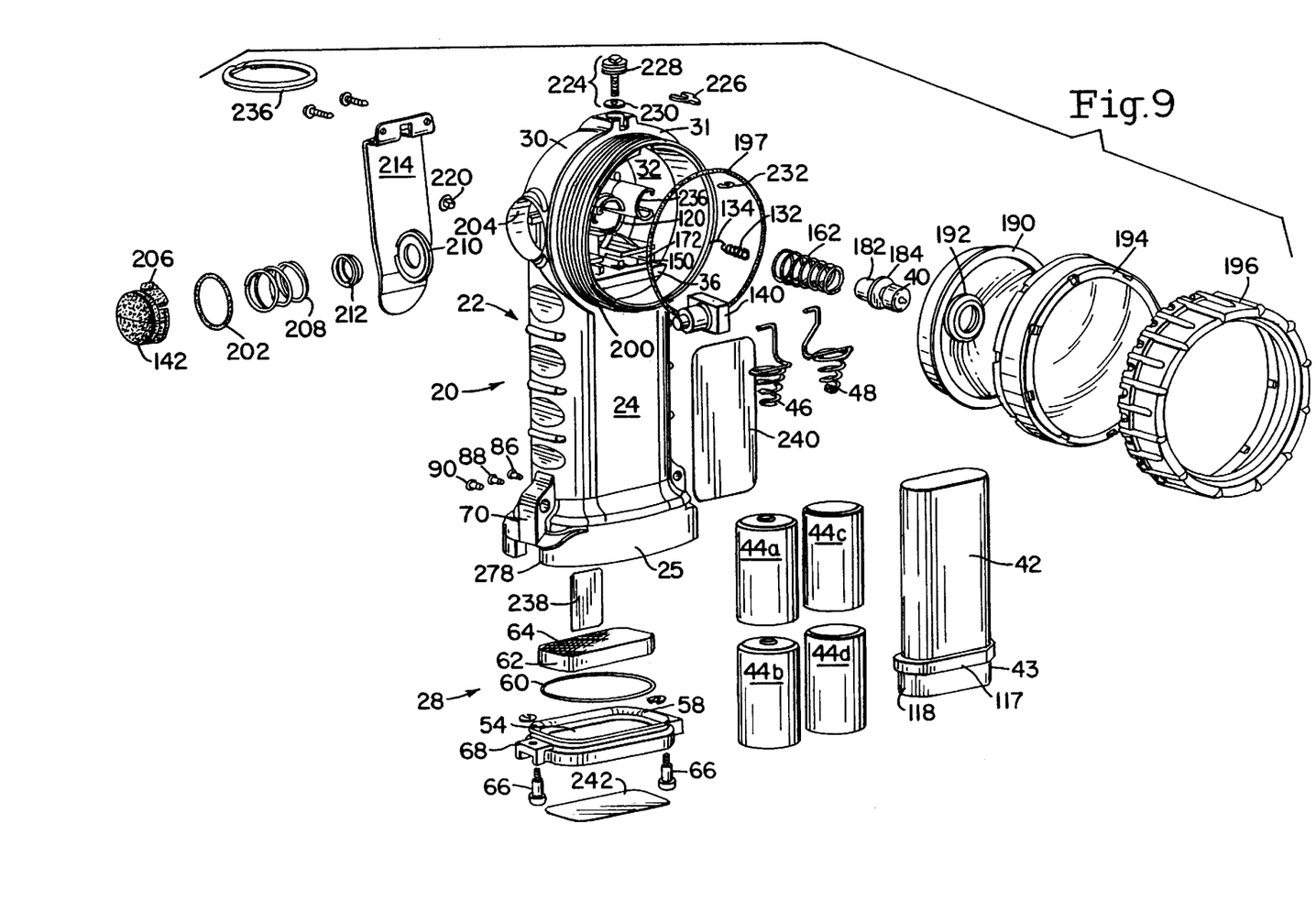
FIG. 9 is an exploded front perspective view of the flashlight illustrating the various components thereof.

As mentioned already, the flashlight 20 may be advantageously powered by the rechargeable battery pack 42 (FIGS. 9 and 17) or by the non-rechargeable alkaline cells 44a, b, c, and d (FIG. 9). The way in which those powered sources are selectively mounted within battery compartment 26 will now be described.

Figure 1:
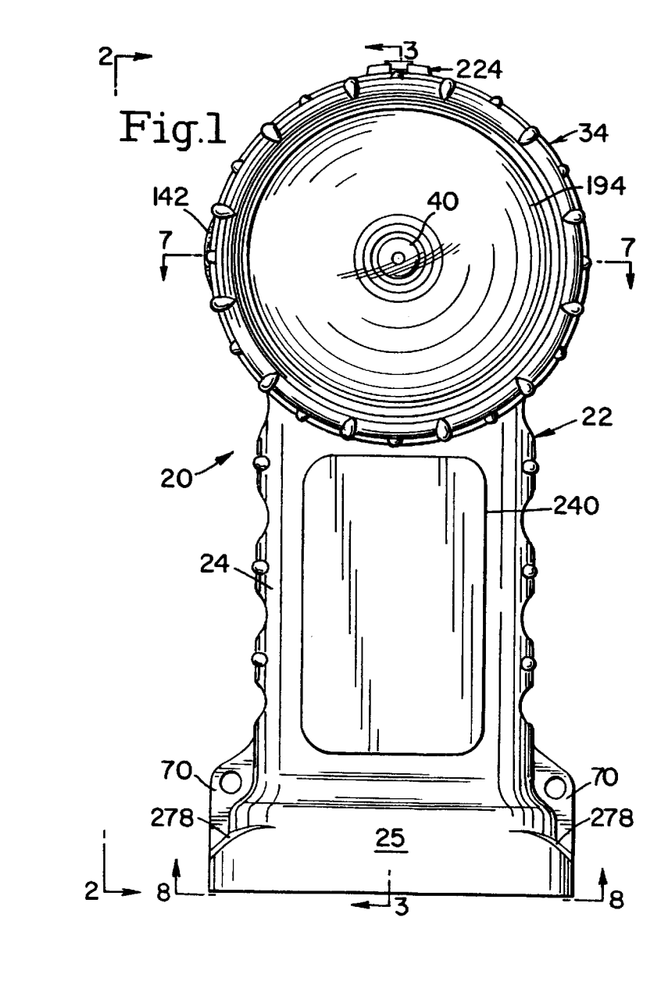
FIG. 1 is a front elevation view of the novel firefighter's flashlight of the invention shown at about three-quarters its actual size.
Figure 2:
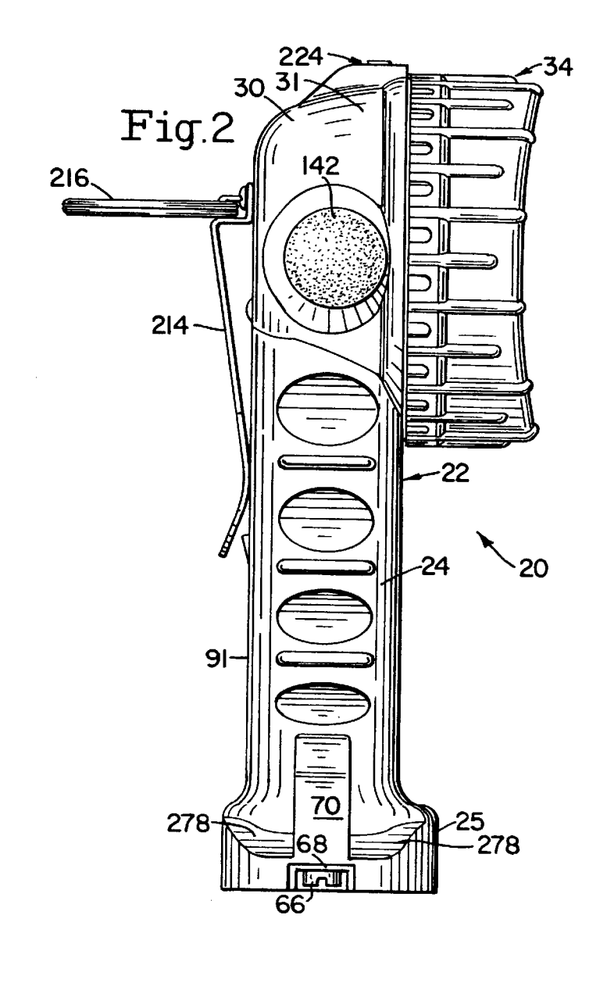
FIG. 2 is a side view of the flashlight of FIG. 1 taken along line 2—2 of FIG. 1.
Figures 3, 4, 5:
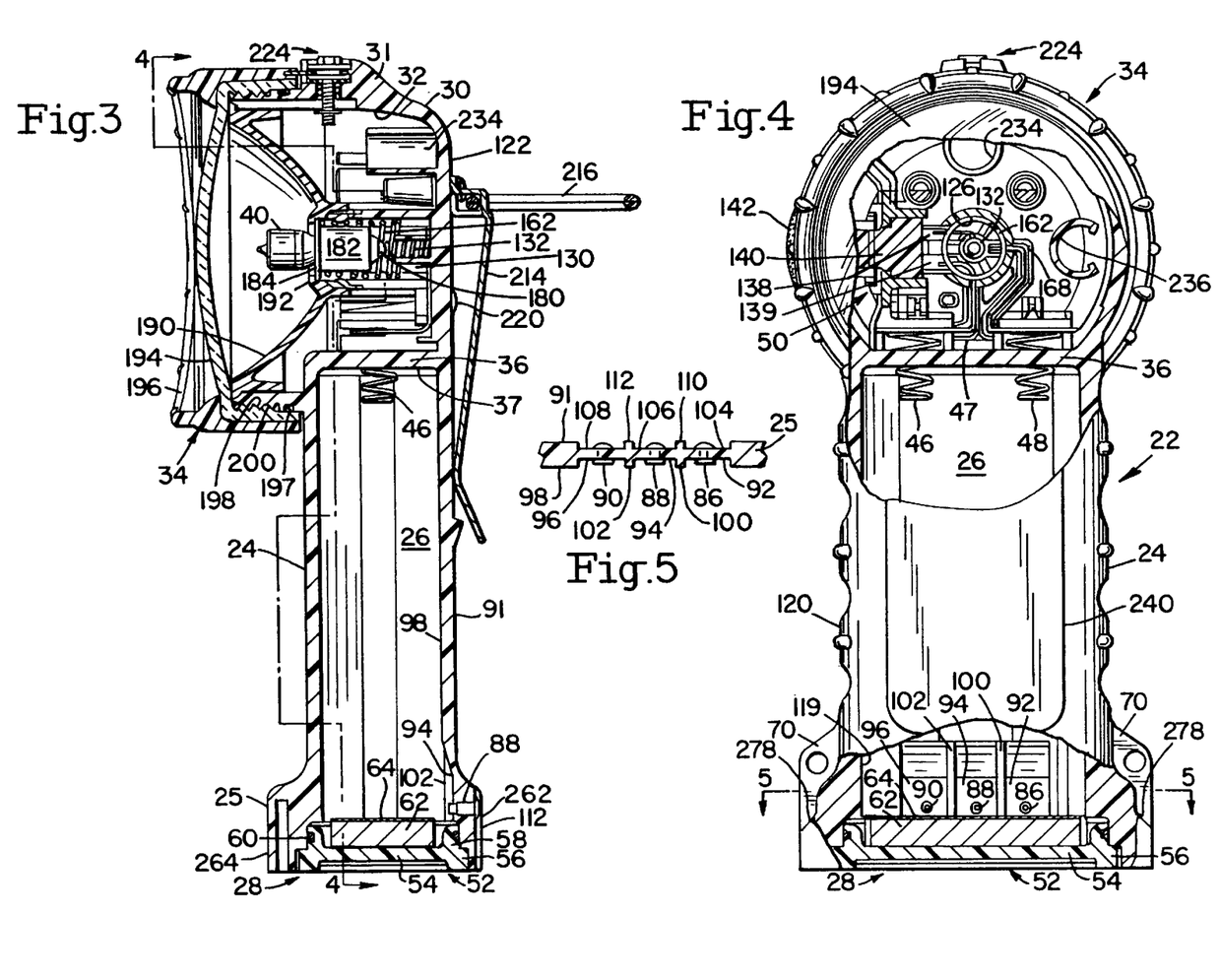
FIG. 3 is a fragmentary sectional view of the flashlight taken along line 3—3 of FIG. 1.
FIG. 4 is a fragmentary sectional view of the flashlight taken along line 4—4 of FIG. 3.
FIG. 5 is a fragmentary sectional view taken along line 5—5 of FIG. 4.
Figure 6:
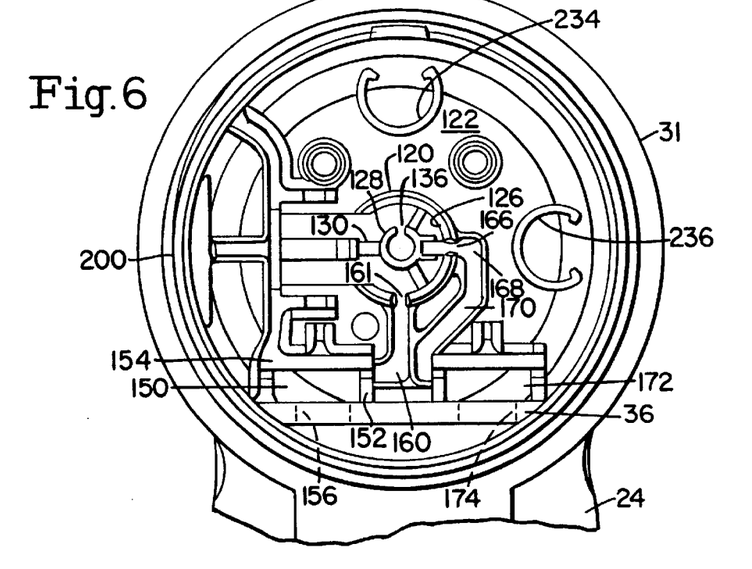
FIG. 6 is an enlarged front perspective view from the open of the head portion of the flashlight.

As shown in FIGS. 3, 4, and 9, the bottom cap assembly 28 includes a bottom cap 52 having a bottom wall 54 formed as part of a lower, generally rectangular flange 56 and a smaller generally rear upper flange 58 having a recess therearound which receives an O-ring 60. A hard resilient foam-insulating pad 62 is secured on top of wall 54 and an electrically conductive metal fabric material 64 is secured on top of pad 62. As shown in FIGS. 3 and 4 flanges 46 and 58 fit into correspondingly shaped bores at the open end of base 25 and the cap is held in place by a pair of shoulder screws 66 which pass through openings in side lugs 68 on the cap and thread into threaded openings provided in side lugs 70 in body portion 24.

Figure 17:
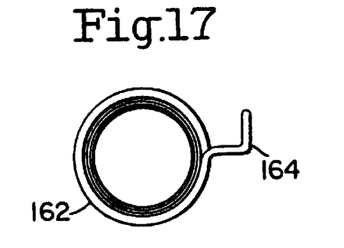
FIG. 17 is a perspective view of the rechargeable battery pack illustrating the charging contacts on the rear wall of the battery pack.

As shown in FIGS. 9 and 17, the battery pack 42 is of generally rectangular configuration, and includes four NiCad batteries wrapped within an insulating sleeve and mounted within an insulating spacer 43 at its bower end.

Pack 42 has positive and negative output terminals 72 and 74, respectively, at its upper end 76 for engaging positive and negative spring terminals 46 and 48, respectively, when the pack is mounted within compartment 26. The length of the pack from its upper end 76 to the bottom end 78 of spacer 43 which engages against the conductive surface 64 of resilient pad 62 is approximately equal to the length of compartment 26 from surface 64 to the bottom face 37 of platform 36 so that the pack is retained within compartment 26 so as to ensure continued operation and minimize any damage thereto during use. A plurality of recharging spring contacts 80, 82, and 84 are fixed at the bottom of the rear wall 85 of pack 42, the spring contacts engaging against the recharging spring contact buttons 86, 88, and 90, respectively, mounted within recesses 92, 94, and 96, respectively, provided at the rear wall 91 of the body portion 24 and base 25. The recesses extend outwardly from the inside face 98 of wall 91 and are separated by small vertical ribs 100 and 102, the inside faces of which are in line with face 98 of wall 91. As shown in FIGS. 3, 4, and 5 the inside contact surfaces of buttons 86, 88, 90 are located within recesses 92, 94, and 96 below the plane of face 98 and the inside surfaces of ribs 100 and 102. Similarly, the outer contact faces of buttons 86, 88, and 90 are positioned within recesses 104, 106, and 108 defined by the aligned external faces of rear wall 91 and external ribs 110 and 112.

Battery spacer 43 includes a flange 117 which has a predetermined tapered configuration on one side 118 which conforms to the same configuration on the inside face 119 of left side wall 120 of body portion 24. This ensures that the pack can be inserted into the compartment 26 in only one way and in proper orientation so that the spring contact fingers 80, 82, and 84 properly engage against buttons 92, 94, and 96. Flange 117 also is sized so that it engages snugly against the walls of compartment 26 to hold the pack in place against lateral movement within the compartment. Thus, not only is the pack 42 retained in place against any significant longitudinal move between the top of pad 32 and the bottom face 37 of wall 36, it is also rested against lateral movement by the snug fit between flange 117 and the inside faces compartment 26.

The NiCad battery pack 42 is designed to supply two hours of burn time. It can be recharged in about one hour by placement in a charging unit 121 illustrated in FIGS. 18 and 19.

When desired, instead of using battery pack 42 in the flashlight, four non-rechargeable C-cell alkaline batteries 44a, 44b, 44c, and 44d may be used. The cells are placed into the compartment 26 in two rows as shown in FIG. 9 with the positive and negative electrodes of batteries 44a and 44c engaging against battery spring contacts 46 and 48, respectively, and the cap assembly 28 is again tightened in place. The negative electrode of cell 44b and the positive electrode of cell 44d engage tightly against the conductive metal fabric 64 to complete the electrical circuit from one row of batteries to the other. The batteries fit within the walls of body portion 24 defining compartment 26 so that the inside face 98 of rear wall 91 and the inside faces of ribs 100 and 102 prevent the cells 44 from engaging against the recessed contacts 86, 88, and 90 which are part of the recharging circuit. This construction and arrangement provides a very simple way of preventing damage to the cells 44 if the flashlight were inadvertently placed into the charging unit 121 with those cells in compartment 26. The cells 44 are thus totally isolated from charging contacts 86, 88, and 90 and can not be damaged by any recharging current. The simplicity of this construction and the significant benefit which it provides is a major feature of this invention.

When the flashlight 20 is powered by the four-C cell alkaline batteries 44, it provides up to five hours of burn time.

The manner in which bulb 40 is mounted within compartment 32 and the circuitry by which power is delivered from battery springs 46 and 48 to bulb 40 will now be described. A tubular socket 120 extends forwardly from the rear wall 122 of head portion 30 and has a bore 126. A smaller diameter socket 128 and ribs 130 extend forwardly a short distance from rear wall 122 centered within bore 126. A small positive contact coil spring 132 (FIGS. 14 and 15) fits within bore 128 and includes an elongated bent end 134 which extends through a slot 136 and then laterally into engagement with an output terminal 138 of on/off switch 140 which is operated by a push button 142 and are part of the switch assembly 50. The left battery coil spring 46 (FIGS. 12 and 13) has its large coil end mounted within a compartment 150 formed by ribs 152 and shelf 154 on top of platform 36. The smaller coils extend downwardly through opening 156 in platform 36 into battery compartment 26. Extending from the large coil end of spring 46 is a terminal wire end 47 of multi-bend configuration which nests within an insulating channel 160 defined by ribs projecting from the wall 122. Wire end 47 extends through a slot 161 in socket 120 so that its terminal end engages input terminal 139 of switch 140.

Figure 7:
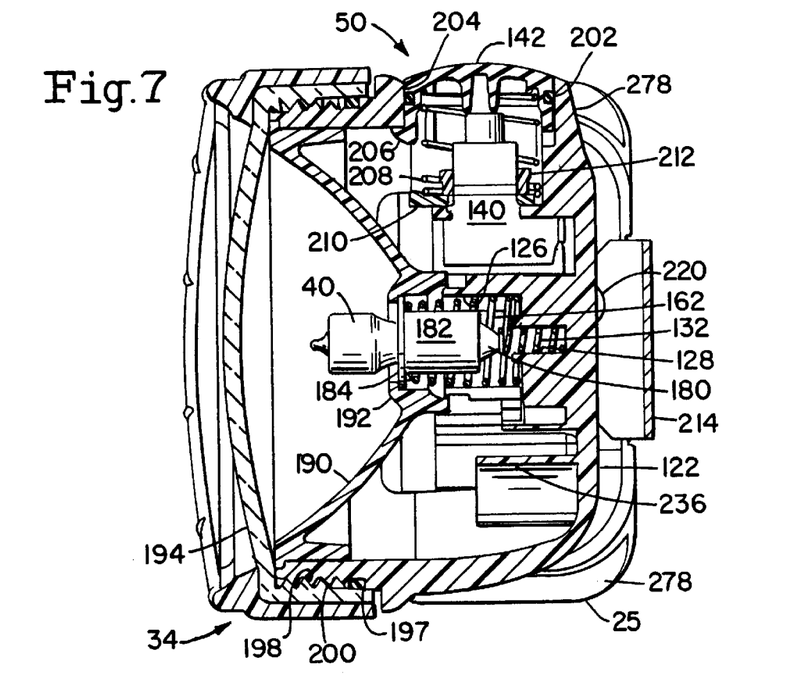
FIG. 7 is a fragmentary sectional view taken along line 7—7 of FIG. 1.
Figures 8, 10, 11, 12, 13, 14, 15:
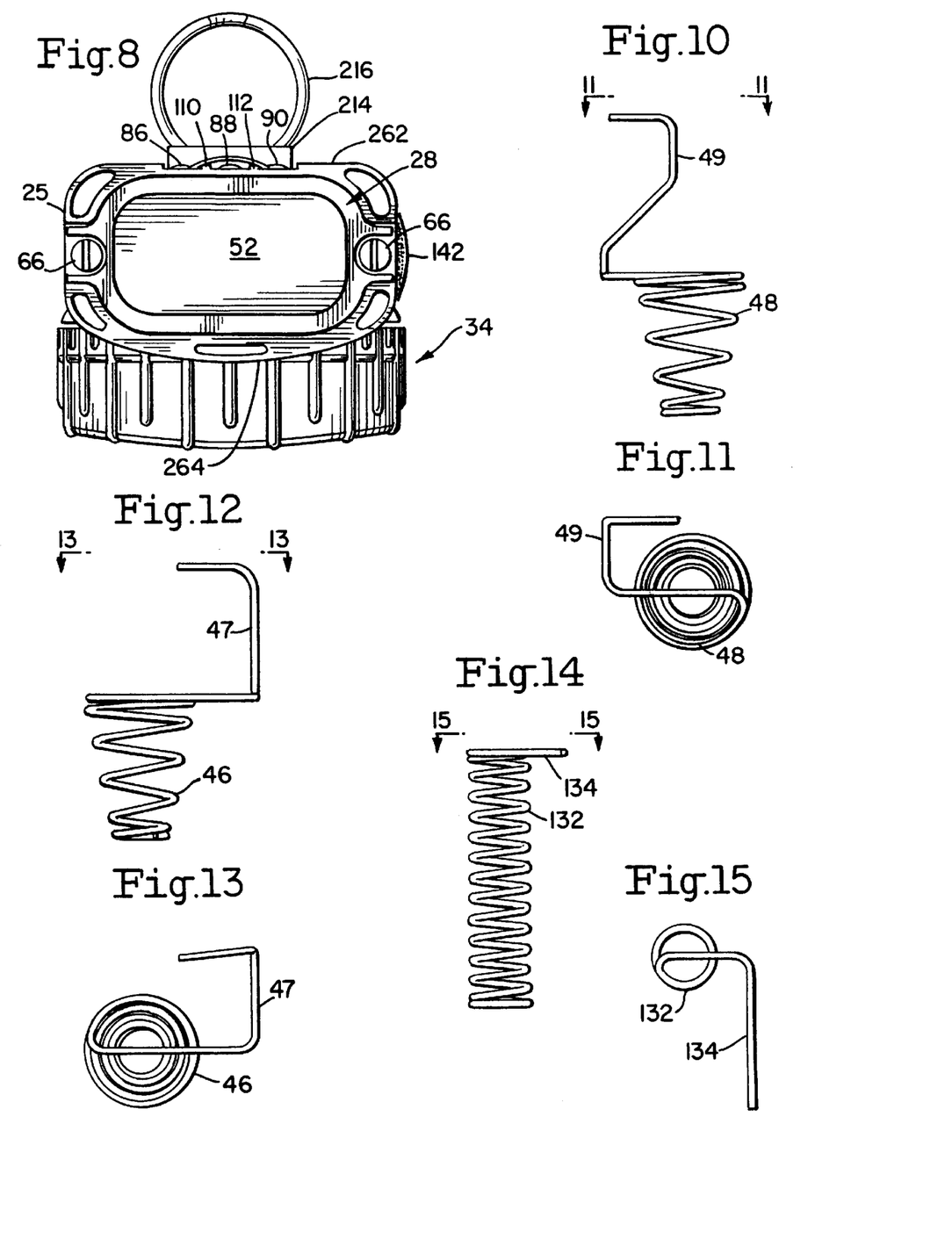
FIG. 8 is a bottom view of the flashlight taken along line 8—8 of FIG. 1.
FIG. 10 illustrates a right battery spring at about twice its actual size.
FIG. 11 is an upper end view of the right battery spring taken along line 11—11 of FIG. 10.
FIG. 12 illustrates the left battery spring at about twice its actual size.
FIG. 13 is an upper end view of the left battery spring taken along line 13—13 of FIG. 12.
FIG. 14 illustrates the positive contact coil spring at about four times its actual size.
FIG. 15 is a view of the positive contact spring taken along line 14—14 of FIG. 12.
Figure 16:
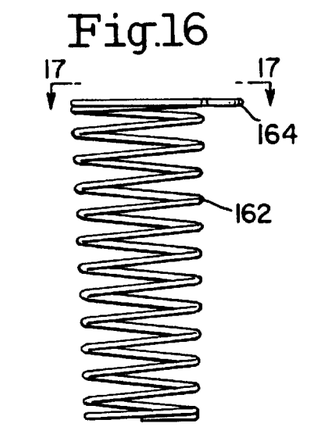
FIG. 16 is a negative contact coil spring illustrated at about twice its actual size.

A negative contact spring 162 (FIG. 16) fits within bore 126 and has its inner end 164 extending laterally from the coils and bent inwardly toward wall 122. The bent end 164 extends outwardly through a slot 166 in socket 120 so that the inner end of spring 162 can rest against ribs 130 axially spaced from rear wall 122. The bent end 164 fits into a contact block 168 mounted within an electrically insulating channel 170 extending down to spring housing 172 identical to housing 150. The negative right battery spring 48 (FIGS. 10 and 11) is mounted within housing 172 and its tapered coiled end extends through opening 174 in platform 36 and down into battery compartment 26. As shown in FIGS. 10 and 11, the inner terminal wire end 49 of the spring 48 is of a multi-bend configuration and, when in place as shown in FIGS. 3, 4, and 7, end 49 nests within channel 170 and makes contact with the end 164 of spring 162 within contact block 168.

Halogen bulb 40 includes a rear contact 180, a plug having an outer metal wall 182 formed with a metal flange 184, and a filament connected at one end to contact 180 and at its other end to a soldered contact on the outer wall 182. Wall 182 fits within the outer end of spring 162 which engages against flange 184 and the bulb is retained in place within bore 126 by the head assembly 34. Assembly 34 includes a reflector 190 having a central hub 192 which fits over bulb 40 and engages against flange 184, a lens ring 194 which fits snug within an escutcheon 196, lens ring 194 being threaded at 198 to thread on to the threaded open end 200 of head portion 30. When cap assembly 34 is threaded onto head portion 30, hub 192 forces flange 184 and plug 182 inwardly, compressing spring 162 and engaging contact 180 with spring 132 thus completing the electrical circuit between the bulb, switch 140, and battery terminals 46 and 48. An O-ring 197 seals between lens ring 194 and threaded head portion 200.

The manner in which the electrical circuit is formed is unique and enables the components of the flashlight to be quickly and easily assembled without the need of any separate wiring or soldering connections. The terminal contact ends of battery spring 46 and positive spring 132 are push fits into the contact fingers 138 and 139 of switch 140.

Similarly, the terminal contact ends of battery spring 48 and negative spring 162 are push fits into contact block 168. Also, the multi-bend configurations of the ends 47 and 49 of springs 46 and 48, respectively, are nested within electrically insulating channels 160 and 170 to avoid any shorts within the circuit.

It should be noted that the switch assembly 50 is mounted on the side of the outer wall 31 of head portion 30 and is readily accessible for operation when the flashlight is being held in the right hand of a firefighter. Assembly 50 includes push button 152 and O-ring 202 mounted on the outer end of button 142, with the push button being slidably retained within the opening 204 on the side of wall 31 by bent over tabs 206 on the inside edge of button 142. Button 142 operates against the force of spring 208 to actuate switch 140 which is held in place in compartment 32 by switch lock 210 and lock ring 212.

Attached to head portion 30 are a belt dip 214 and a slip key ring 216 so that the flashlight may be readily connected to a fireman's belt or strap or other protective gear, so as to free both hands of the fireman for other uses.

A pressure relief check valve 220 is mounted in the rear wall of head portion 30 to relieve any buildup of pressure in compartment 32.

A locking assembly 224 including a locking strip 226, lock screw 228, gasket 230, and retaining ring 232 may be provided on the top of head portion 30 to lock escutcheon 196 against rotation on head portion 30.

Also fixed to rear wall 122 are sockets 234 and 236 for holding spare bulbs for the flashlight.

A label 238 may be fixed to the inside face of the front wall of the flashlight to indicate the proper orientation of the four C-cell batteries within compartment 26. A label 240 may be provided on the front wall of the flashlight and a label 242 may be provided on the bottom cap 52 to indicate appropriate information to the firefighter.

Figure 18:
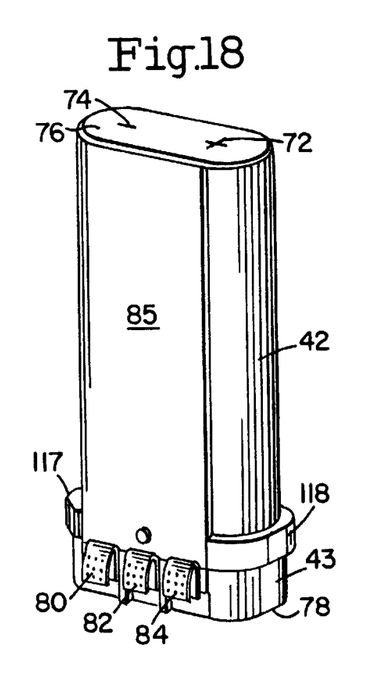
FIG. 18 is a top perspective view of the charger assembly used with the flashlight of FIG. 1 for charging the rechargeable battery pack contained therein.
Figure 19:
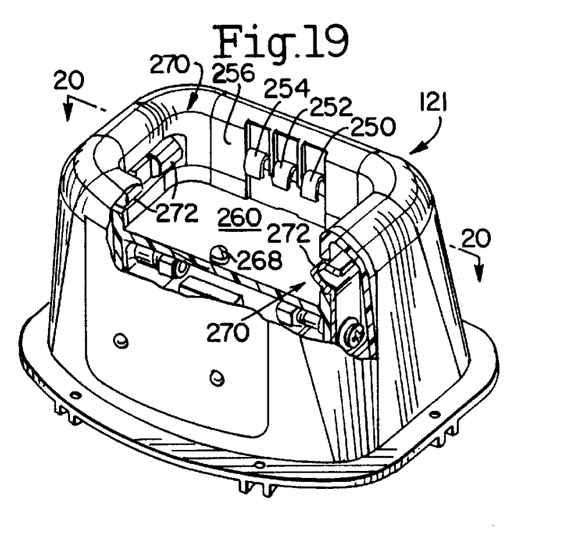
FIG. 19 is a top plan view of the charger assembly taken along line 19—19 of FIG. 18.
Figure 20:
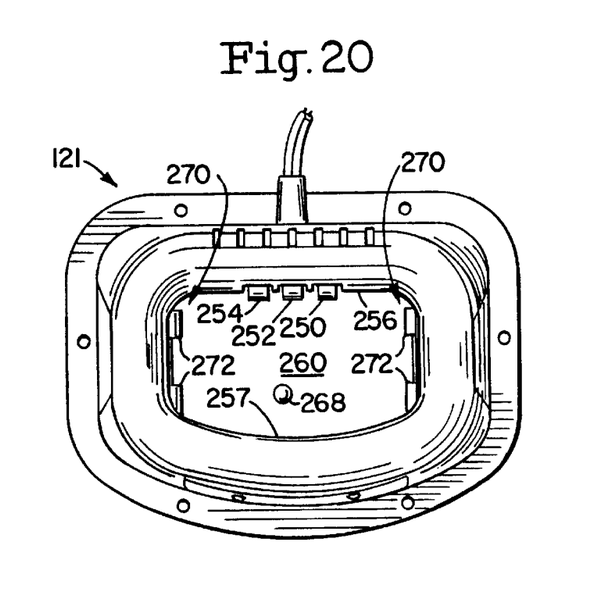

As mentioned previously, when the flashlight 20 containing a battery pack 42 is to be recharged, the flashlight is conveniently placed in the charger 121 illustrated in FIGS. 18 and 19. The charger is usually bolted in place on a flat surface such as a table or a wall and includes circuitry suitable for charging the flashlight. The charger includes a plurality of spring loaded finger contacts 250, 252, and 254 for engagement by contacts 86, 88, and 90, respectively, when the base portion 25 of flashlight 20 is pushed down into the well 260 of charger unit 121. As shown in FIG. 8, the rear wall 262 of base 25 is straight while the front wall 264 is slightly curved, thus conforming to the same configuration of the rear wall 256 and front wall 257 defining well 260 of charger unit 121 (FIG. 20) This ensures that the flashlight to be recharged can go into the well 260 only in proper orientation so that contact 86, 88, and 90 properly engage contact fingers 250, 252, and 254. A push button switch 268 is mounted on the bottom wall of well 260 and is actuated to a closed position by bottom cap 52 as the flashlight is inserted into well 260, thus automatically turning the charging unit 121 on to start the recharging cycle. Mounted on each side of well 260 is a spring loaded retaining member 270 including two spaced apart, double tapered retaining dips 272 which release outwardly from well 260 and permit the base 25 of the flashlight to be pushed down into the well when the flashlight is to be recharged. When base 25 is fully seated in well 260, clips 270 spring back inwardly and lock against tapered surfaces 278 on base 25 on both sides of lugs 70. In this way during the recharging process the flashlight is locked in place within the charging unit. When the charging cycle is completed, flashlight may be removed from well 260 with one hand merely by pulling the light out of the well, forcing the tapered clips 272 to spring outwardly and thus release the flashlight. This is a very useful convenience, since the firefighter need only use one hand to remove the flashlight while his other hand is available for other uses.

The foregoing relates to preferred exemplary embodiments of the invention, it being understood that other variants and embodiments thereof are possible within the spirit and scope of the invention, the latter being defined by the appended claims.

What is claimed is:

1. A flashlight adapted for use with either a non-rechargeable or rechargeable battery, said flashlight comprising:

a tubular body portion, said body portion including at least one elongated wall defining a battery compartment;

a head portion, said head portion including a bulb mounting compartment;

a battery contact mounted at one end of said battery compartment;

an electrical circuit connecting said battery contact to said bulb mounting compartment; and a charging contact for enabling a rechargeable battery to be recharged while in said battery compartment, said charging contact positioned on said at least one elongated wall so that said charging contact can not be contacted by a non-rechargeable battery within said battery compartment.

2. The flashlight of claim 1, wherein said charging contact is recessed in said elongated wall of said battery compartment.

3. The flashlight of claim 1, wherein said battery compartment accommodates a rechargeable battery.

4. The flashlight of claim 1, wherein said battery compartment accommodates a non-rechargeable battery.

5. The flashlight of claim 4, wherein said battery compartment accommodates a rechargeable battery.

6. The flashlight of claim 1, further comprising an opening for insertion of a battery in said battery compartment and an end cap for closing said opening.

7. The flashlight of claim 6, wherein said end cap further includes an electrical conductor forming part of said electrical circuit.

8. The flashlight of claim 6, wherein said end cap is insulated from said battery.

9. The flashlight of claim 1, wherein said head portion is at a substantially right angle to said body portion.

10. The flashlight of claim 1, further comprising a retainer for retaining a battery in said battery compartment.

11. The flashlight of claim 1, further comprising a plurality of charging contacts.

12. The flashlight of claim 1, combined with a charging unit comprising a well for receiving the bottom end of said flashlight, said well including a contact for engaging said charging contact on said flashlight.

13. The combination of claim 12, further comprising an automatically releasable retainer within said well for automatically locking said flashlight when said flashlight is pushed into said well and automatically releasing said flashlight when said flashlight is pulled out of said well.

14. A battery compartment of a flashlight, said battery compartment comprising:

at least one elongated wall defining said battery compartment;

a battery contact located at one end of said battery compartment for coupling said battery compartment to an electrical circuit; and a charging contact for enabling a rechargeable battery to be recharged while said rechargeable battery is in said battery compartment, said charging contact positioned on said at least one elongated wall so that said charging contact is not contacted by a non-rechargeable battery while said non-rechargeable battery is in said battery compartment.

15. The battery compartment of claim 14, wherein said charging contact is recessed in said battery compartment.

16. The battery compartment of claim 14, wherein said battery compartment accommodates a rechargeable battery.

17. The battery compartment of claim 14, wherein said battery compartment accommodates a non-rechargeable battery.

18. The battery compartment of claim 17, wherein said battery compartment accommodates a rechargeable battery.

19. The battery compartment of claim 14, further comprising an opening for insertion of a battery in said battery compartment, and end cap for closing said opening.

20. The battery compartment of claim 19, wherein said end cap further includes an electrical conductor forming part of said electrical circuit.

21. The battery compartment of claim 19, wherein said end cap is insulated from said battery.

22. The battery compartment of claim 14, further comprising a retainer for retaining a battery in said battery compartment.

23. The battery compartment of claim 14, further comprising a plurality of charging contacts.

24. A flashlight, said flashlight comprising:

a tubular body portion, said body portion including at least one elongated wall and a battery compartment;

a head portion, said head portion including a bulb mounting compartment;

a battery contact mounted at one end of said battery compartment;

an electrical circuit connecting said battery contact to said bulb mounting compartment; and a charging contact for enabling a rechargeable battery to be recharged while in said battery compartment, said charging contact positioned on said at least one elongated wall so that said charging contact is isolated from a non-rechargeable battery within said battery compartment.

25. The flashlight of claim 24, wherein said charging contact is recessed in said wall of said battery compartment.

26. The flashlight of claim 24, wherein said battery compartment accommodates a rechargeable battery.

27. The flashlight of claim 24, wherein said battery compartment accommodates a non-rechargeable battery.

28. The flashlight of claim 27, wherein said battery compartment accommodates a rechargeable battery.

29. The flashlight of claim 24, further comprising an opening for insertion of a battery in said battery compartment, and an end cap for closing said opening.

30. The flashlight of claim 29, wherein said end cap further includes an electrical conductor forming part of said electrical circuit.

31. The flashlight of claim 29, wherein said end cap is insulated from said battery.

32. The flashlight of claim 24, wherein said head portion is at a substantially right angle to said body portion.

33. The flashlight of claim 24, further comprising a retainer for retaining a battery in said battery compartment.

34. The flashlight of claim 24, further comprising a plurality of charging contacts.

35. The flashlight of claim 24, combined with a charging unit comprising a well for receiving the bottom end of said flashlight, said well including a contact for engaging said charging contact on said flashlight.

36. The combination of claim 35, further comprising an automatically releasable retainer within said well for automatically locking said flashlight when said flashlight is pushed into said well and automatically releasing said flashlight when said flashlight is pulled out of said well.

* * * * *